US010665865B2

(12) United States Patent
Huang et al.

(10) Patent No.: US 10,665,865 B2
(45) Date of Patent: May 26, 2020

(54) COPPER FOIL FOR CURRENT COLLECTOR OF LITHIUM SECONDARY BATTERY AND NEGATIVE ELECTRODE INCLUDING THE SAME

(71) Applicant: Chang Chun Petrochemical Co., LTD., Taipei (TW)

(72) Inventors: Huei-Fang Huang, Taipei (TW); Kuei-Sen Cheng, Taipei (TW); Jui-Chang Chou, Taipei (TW); Yao-Sheng Lai, Taipei (TW)

(73) Assignee: Chang Chun Petrochemical Co., Ltd., Taipei (TW)

( * ) Notice: Subject to any disclaimer, the term of this patent is extended or adjusted under 35 U.S.C. 154(b) by 0 days.

(21) Appl. No.: 16/403,473

(22) Filed: May 3, 2019

(65) Prior Publication Data

US 2020/0106102 A1 Apr. 2, 2020

(30) Foreign Application Priority Data

Oct. 1, 2018 (TW) .............................. 107134714 A

(51) Int. Cl.
*B21C 37/00* (2006.01)
*H01M 4/66* (2006.01)
*H01M 10/0525* (2010.01)
*C22C 9/00* (2006.01)
*C25D 1/04* (2006.01)
(Continued)

(52) U.S. Cl.
CPC ............... *H01M 4/661* (2013.01); *C22C 9/00* (2013.01); *C25D 1/04* (2013.01); *C25D 7/0614* (2013.01); *H01M 4/0402* (2013.01); *H01M 4/667* (2013.01); *H01M 10/0525* (2013.01); *H01M 2004/027* (2013.01); *H01M 2220/30* (2013.01)

(58) Field of Classification Search
None
See application file for complete search history.

(56) References Cited

U.S. PATENT DOCUMENTS 3,502,551 A * 3/1970 Gunther ................... C25D 3/38
205/298
9,647,272 B1 * 5/2017 Cheng ................... H01M 4/667
(Continued)

FOREIGN PATENT DOCUMENTS

JP   09306504 A    11/1997
JP   2018014332 A   1/2018
(Continued)

OTHER PUBLICATIONS

IPC, IPC-TM-650 Test Methods Manual, Aug. 1980, The Institute for Interconnecting and Packaging Electronic Circuits, 2.4.18B, 2 pages. (Year: 1980).*

*Primary Examiner* — Seth Dumbris
*Assistant Examiner* — Kim S. Horger
(74) *Attorney, Agent, or Firm* — Womble Bond Dickinson (US) LLP

(57) ABSTRACT

The present disclosure provides an electrodeposited copper foil having a puncture strength value and a tear strength value. A ratio of the puncture strength value to the tear strength value is from 14 to 64. The present disclosure also provides a lithium-ion secondary battery. The lithium-ion secondary battery is manufactured by using the electrodeposited copper foil and has excellent charge-discharge cycle life.

9 Claims, 4 Drawing Sheets

(51) Int. Cl.
*H01M 4/04* (2006.01)
*C25D 7/06* (2006.01)
*H01M 4/02* (2006.01)

(56) References Cited

U.S. PATENT DOCUMENTS

| | | |
|---|---|---|
| 2006/0011488 A1 | 1/2006 | Masashi et al. |
| 2007/0134556 A1 | 6/2007 | Sano et al. |
| 2011/0171491 A1* | 7/2011 | Suzuki .................... C25D 1/04 |
| | | 428/687 |

FOREIGN PATENT DOCUMENTS

| | | |
|---|---|---|
| TW | I526578 B | 3/2016 |
| TW | I600200 B | 9/2017 |
| WO | 2004059040 A1 | 7/2004 |
| WO | 2013080988 A1 | 6/2013 |
| WO | 2017217085 A1 | 12/2017 |

* cited by examiner

COPPER FOIL FOR CURRENT COLLECTOR OF LITHIUM SECONDARY BATTERY AND NEGATIVE ELECTRODE INCLUDING THE SAME

CROSS-REFERENCE TO RELATED APPLICATION

This application claims priority to Taiwan Application Serial Number 107134714, filed Oct. 1, 2018, which is herein incorporated by reference.

BACKGROUND

Field of Invention

The present disclosure relates to an electrodeposited copper foil, a current collector of a secondary battery using the electrodeposited copper foil, an electrode of a secondary battery formed by stacking an active substance on the current collector, and a second battery assembled with the electrode.

Description of Related Art

Lithium-ion secondary batteries are commonly used in electronic devices, such as mobile phones and notebook computers. With the development of electronic devices, excellent capacity and charge-discharge cycle life are important characteristics demanded by lithium-ion secondary batteries.

Conventionally, a copper foil is used as a current collector of a negative electrode of a lithium-ion secondary battery. A carbon material such as graphite, a conductive agent, and an adhesive are mixed to form a slurry substance that serves as a negative electrode (anode) material and is coated on the copper foil to make a negative electrode.

In order to have sufficient adhesion with the active material layer, the copper foil used for the current collector of the negative electrode of the lithium-ion secondary battery needs to have appropriate roughness. Generally speaking, the smoother the surface of the copper foil is, the more uniform the negative electrode material coated on the surface. When the surface of the copper foil is excessively rough, the thickness of the negative electrode material coated on the surface is not uniform, so that the capacity of the negative electrode cannot be uniformly released. At the same time, inconsistent binding strength results in an imbalance in the charge-discharge cycle life of the negative electrode coating, which in turn accelerates the attenuation of battery capacity. In other words, when the surface of the copper foil is excessively rough, the utilization efficiency of the active material (that is, lithium ion) of the lithium-ion secondary battery is deteriorated to cause a decrease in capacity. In addition, when the surface of the copper foil is excessively rough, the negative electrode material easily peels off during charging and discharging, thus reducing the charge-discharge cycle life of the lithium-ion secondary battery.

Since modulation of the physical properties of the copper foil can affect the charge-discharge cycle life of the lithium-ion secondary battery, there is a need to develop a copper foil suitable for lithium-ion secondary batteries, which has become one of the important subjects in the battery field.

SUMMARY

An electrodeposited copper foil is provided. The electrodeposited copper foil has a puncture strength value and a tear strength value. A ratio of the puncture strength value to the tear strength value is from 14 to 64.

In the foregoing, the puncture strength value is from 300 to 1200 $N/mm^{1.17}$.

In the foregoing, the tear strength value is less than 50 N/mm.

In the foregoing, the electrodeposited copper foil has a deposition surface, and a surface roughness (Rz) of the deposition surface is less than 2.0 µm.

In the foregoing, a mass per unit area of the electrodeposited copper foil is from 17.8 to 329.4 $g/m^2$.

The present disclosure provides a negative electrode. The negative electrode comprises an electrodeposited copper foil, and the electrodeposited copper foil has a puncture strength value and a tear strength value. A ratio of the puncture strength value to the tear strength value is from 14 to 64.

The present disclosure further provides an electrodeposited copper foil. The electrodeposited copper foil has a puncture strength value of 300 to 1200 $N/mm^{1.17}$ and a tear strength value less than 50 N/mm.

In the foregoing, the electrodeposited copper foil has a deposition surface, and a surface roughness (Rz) of the deposition surface is less than 2.0 µm.

In the foregoing, a mass per unit area of the electrodeposited copper foil is from 17.8 to 329.4 $g/m^2$.

The present disclosure still provides a negative electrode. The negative electrode comprises an electrodeposited copper foil, and the electrodeposited copper foil has a puncture strength value of 300 to 1200 $N/mm^{1.17}$ and a tear strength value less than 50 N/mm.

It is to be understood that both the foregoing general description and the following detailed description are by examples, and are intended to provide further explanation of the present disclosure as claimed.

BRIEF DESCRIPTION OF THE DRAWINGS

The accompanying drawings are included to provide a further understanding of the present disclosure, and are incorporated in and constitute a part of this specification. The drawings illustrate embodiments of the present disclosure and, together with the description, serve to explain the principles of the present disclosure.

DETAILED DESCRIPTION

To make the contents of the present disclosure more thorough and complete, the following illustrative description is provided with regard to the implementation aspects and embodiments of the present disclosure, which is not intended to limit the scope of the present application. The embodiments disclosed herein may be combined or substituted with each other in an advantageous manner, and other embodiments may be added to an embodiment without further description or explanation. In the following description, numerous specific details will be described in detail in order to enable the reader to fully understand the following examples. However, embodiments of the present disclosure may be practiced without these specific details.

According to various embodiments, the electrodeposited copper foil according to the present disclosure is suitable for use in a lithium-ion secondary battery. The lithium-ion secondary battery may be applied to an electronic device, such as a power tool, an electric vehicle, a mobile phone, a tablet computer, or a portable electronic device, etc. In greater detail, the lithium-ion secondary battery comprises a positive electrode, a negative electrode, and a separator disposed between the positive electrode and the negative electrode and an electrolytic solution. It is noted that the structure of the lithium-ion secondary battery of the present disclosure is not particularly limited, and may be a laminated type or spiral type lithium-ion secondary battery. In addition, the materials of the positive electrode, the separator, and the electrolytic solution in the lithium-ion secondary battery are not particularly limited, and may be any materials known in the art to be suitable for a positive electrode, a separator, and an electrolytic solution of a lithium-ion secondary battery.

Figure 1:
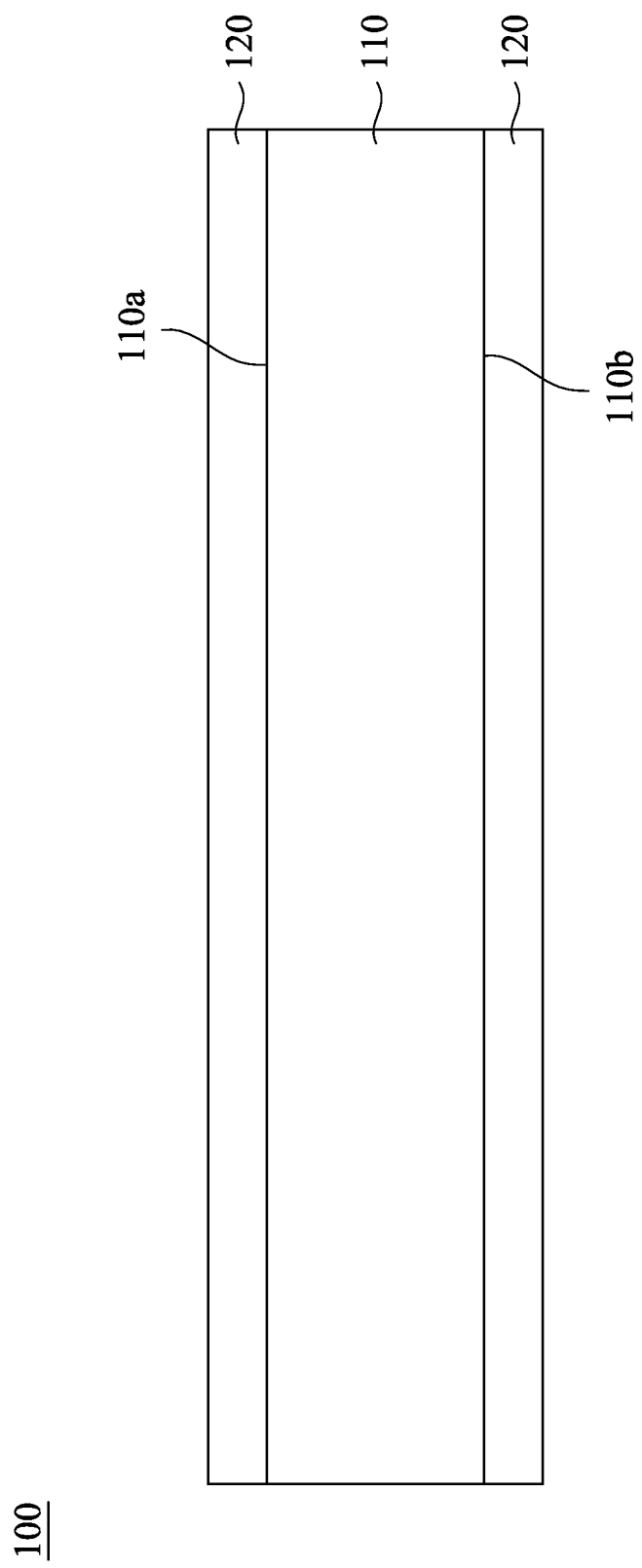
FIG. 1 depicts a cross-sectional schematic diagram of a negative electrode according to one embodiment of the present disclosure.

A description is provided with reference to FIG. 1. FIG. 1 depicts a cross-sectional schematic diagram of a negative electrode 100 according to one embodiment of the present disclosure. As shown in FIG. 1, the negative electrode 100 comprises an electrodeposited copper foil 110 and negative material layers 120. In greater detail, the electrodeposited copper foil 110 has a deposition surface 110a and a drum surface 110b, and the deposition surface 110a and the drum surface 110b are opposite to each other. The term "drum surface" refers to one surface of the electrodeposited copper foil 110 that is in contact with the cathode drum when the electrodeposited copper foil 110 is prepared. The term "deposition surface" refers to one surface of the electrodeposited copper foil 110 that is in contact with the electrolytic solution (which is opposite to the drum surface). A detailed description is provided as follows.

The negative material layers 120 are disposed on the deposition surface 110a and the drum surface 110b. The method for forming the negative material layers 120 according to the present disclosure may be, for example, coating a negative material on the electrodeposited copper foil 110 and followed by drying and pressing processes. Generally, the negative material layers 120 comprise a carbon material, a conductive material, an adhesive, and a non-aqueous solvent. For example, the carbon material may be selected from the group consisting of non-graphitizable carbon, coke, graphite, glassy carbon, carbon fiber, activated carbon, and carbon black. The adhesive may be, for example, polyvinylidene fluoride (PVDF), polyvinylidene fluoride hexafluoropropylene (PVDF-HFP), polyimine (PI), carboxymethyl cellulose (CMC), polytetrafluoroethylene (PTFE), polyvinyl acetate (PVA), acrylic resin, epoxy resin, polyurethane resin, urea resin, styrene nitrile rubber (SBR), or a combination thereof. The non-aqueous solvent may be, for example, N-methyl-2-pyrrolidone (NMP).

In one embodiment, a thickness of the electrodeposited copper foil 110 may be from 1 to 50 micrometers (μm), for example, 4, 8, 12, 16, 20, 24, 28, 32, 36, 40, or 44 μm. It is noted that the thickness of the electrodeposited copper foil 110 of the present disclosure does not affect the physical properties, such as surface roughness (Rz), puncture strength value, or tear strength value, etc., of the electrodeposited copper foil 110, and a description in this regard is provided as follows.

Figure 2:
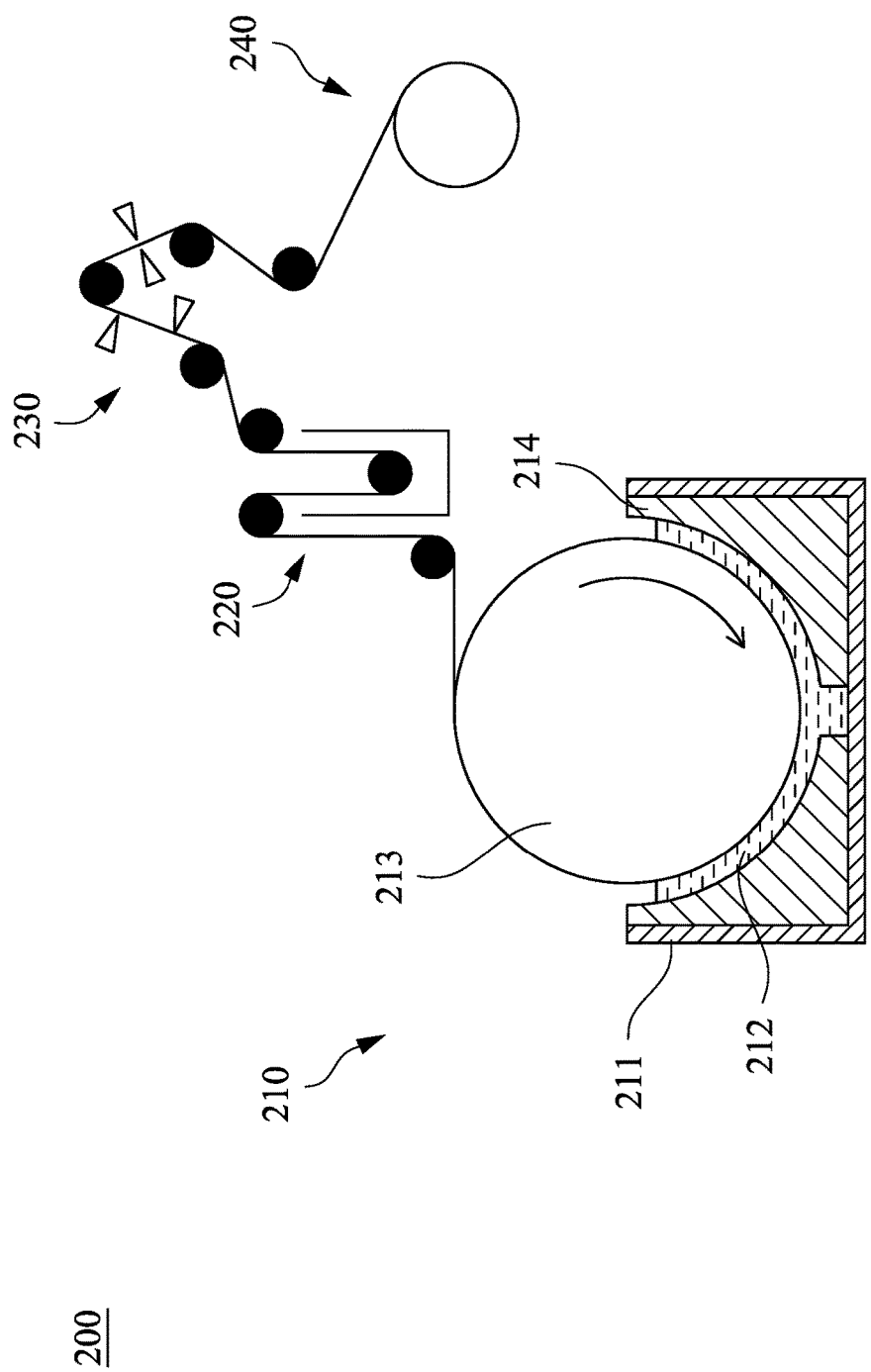
FIG. 2 depicts a schematic diagram of an electrodeposition apparatus for preparing an electrodeposited copper foil according to one embodiment of the present disclosure.

A description is provided with reference to FIG. 2. FIG. 2 depicts a schematic diagram of an electrodeposition apparatus 200 for preparing an electrodeposited copper foil according to one embodiment of the present disclosure. As shown in FIG. 2, the electrodeposition apparatus 200 comprises an electrolytic tank 211, a cathode drum 213, and an anode 214. An electrolytic solution 212 is placed in the electrolytic tank 211. The cathode drum 213 is disposed in the electrolytic tank 211, and a portion of the cathode drum 213 is in contact with the electrolytic solution 212.

The cathode drum 213 may be made of aluminum, aluminum alloy, titanium, or titanium alloy. In one embodiment, the cathode drum 213 comprises titanium, and the anode 214 comprises titanium coated with iridium dioxide ($IrO_2$). The electrolytic solution 212 is, for example, a copper-containing solution. Preferably, the electrolytic solution 212 is a copper sulfate solution.

A method for preparing the electrodeposited copper foil according to the present disclosure is provided as follows. First, the cathode drum 213 is rotated in one direction and in contact with the electrolytic solution 212 in an electrochemical reaction stage 210. At this time, direct current is applied to electrodeposit copper on a surface of the cathode drum 213 to form a thin copper layer. A surface of the thin copper layer in contact with the cathode drum 213 is referred to as a "drum surface", and a surface of the thin copper layer in contact with the electrolytic solution 212 is referred to as a "deposition surface". Next, after the thin copper layer is rotated to leave the electrolytic solution 212, the thin copper layer is peeled off, and an anti-corrosion treatment 220 is performed. Generally, a surface of the electrodeposited copper layer that is peeled off is treated by zinc/chromium plating, chromium plating, chromium dipping, or organic dipping to perform the anti-corrosion treatment so as to prevent oxidation. After that, the thin copper layer passes a series of guide rollers and is dried by using an air knife in a drying stage 230. The prepared thin copper layer is thereafter collected through using a winding device 240. Finally, the wound thin copper layer is cut to form electrodeposited copper foils having an appropriate size.

It is noted that the electrolytic solution 212 affects the physical properties of the prepared electrodeposited copper foil. In greater detail, adjusting a concentration of a specific component in the electrolytic solution 212 can change physical properties, such as surface roughness (Rz), puncture strength value, and tear strength value, etc. of the electrodeposited copper foil. For example, in one embodiment, the electrolytic solution 212 may comprise 3-S-isothiuronium propyl sulfonate (UPS) and chromium trioxide ($CrO_3$). Through adjusting a concentration of the 3-S-isothiuronium propyl sulfonate or chromium trioxide, the above physical properties of the electrodeposited copper foil can be changed. However, it should be understood that any component that can be used to change the above physical properties of the electrodeposited copper foil is within the scope of the present disclosure. In other words, the electrolytic solution 212 according to the present disclosure is not limited to using the 3-S-isothiuronium propyl sulfonate or chromium trioxide as the component for changing the above physical properties of the electrodeposited copper foil.

As mentioned previously, when the surface of the copper foil is excessively rough, the negative electrode material coated on its surface is affected and thus leads to decreases in capacity and charge-discharge cycle life of the lithium-ion secondary battery. In other words, surface roughness of the deposition surface 110a (as show in FIG. 1) of the electrodeposited copper foil 110 affects the capacity and charge-discharge cycle life of the lithium-ion secondary battery. It is noted that the term "charge-discharge cycle life" refers to the number of times the battery can perform charge-discharge cycles until the nominal capacity of the battery drops to 80% of its initial rated capacity. In addition, the term "roughness" refers to an element of the surface texture of an object that is quantified by the deviation of the orthogonal vector of the actual surface from the orthogonal vector of its ideal form. The larger the deviation is, the rougher the surface. Conversely, the smaller the deviation is, the smoother the surface.

Generally, roughness is often expressed as the Rz value. "Roughness (Rz) (ten-point mean roughness)" refers to the sum of the average value of the absolute values of the five consecutive peak heights and the average value of the absolute values of the five consecutive valley heights in the sampling segment. In order to increase the capacity and charge-discharge cycle life, the deposition surface of electrodeposited copper foil of the present disclosure has an appropriate roughness (Rz). Preferably, in one embodiment, the surface roughness (Rz) of the deposition surface of the electrodeposited copper foil is less than 2.0 μm, such as 0.2, 0.4, 0.6, 0.8, 1.0, 1.2, 1.4, 1.6 or 1.8 μm. It is noted that, the roughness (Rz) in the present disclosure is measured based on the JIS B 0601-1994 method.

It is noted that the inventors find the puncture strength value and tear strength value of the electrodeposited copper foil have correlations with the charge-discharge cycle life of the lithium-ion secondary battery through study. In greater detail, when the puncture strength value and tear strength value of the electrodeposited copper foil are respectively within specific ranges, the manufactured lithium-ion secondary battery has excellent charge-discharge cycle life. Preferably, in one embodiment, the puncture strength value of the electrodeposited copper foil is 300 to 1200 N/mm$^{1.17}$, such as 400, 500, 600, 700, 800, 900, 1000 or 1100 N/mm$^{1.17}$. When the puncture strength value is less than 300 N/mm$^{1.17}$, the electrodeposited copper foil is too brittle, so that the electrodeposited copper foil tends to crack during charging and discharging. Similarly, when the puncture strength value exceeds 1200 N/mm$^{1.17}$, the electrodeposited copper foil is too hard, so that the electrodeposited copper foil also tends to crack during charging and discharging. As a result, the charge-discharge cycle life is reduced.

A method for measuring the puncture strength value of the electrodeposited copper foil according to the present disclosure is provided as follows. First, the electrodeposited copper foil is cut to a specimen having a length of 120 mm and a width of 30 mm. Next, a needle penetration test is performed by using a universal testing machine (TKS-20N manufactured by IMADA). The test is carried out at room temperature (15 to 35° C.), and the needle used is MS2-1R7 manufactured by Mitutoyo with an entry speed of 50 mm/min. The maximum load value acting on the specimen when the specimen is penetrated is read, and the maximum load value is defined as "puncture force (N)". During the test, five measurements are performed on each of the deposition surface and the drum surface of each specimen. After that, the measured values of both surfaces are averaged to obtain the puncture force (N) of the electrodeposited copper foil. Next, the density of the electrodeposited copper foil is defined to be 8.909×10$^6$ g/m$^3$ based on the TM-650 (2.4.18b), and the puncture strength value (N/mm$^{1.17}$) of the electrodeposited copper foil is calculated according to the following formula (1).

$$\text{puncture strength value (N/mm}^{1.17}) = \frac{\text{puncture force (N)}}{[\text{mass per unit area (g/m}^2)/\text{density(g/m}^3) \times 10^3 \text{ (mm/m)}]^{1.17}} \quad \text{Formula (1)}$$

In one embodiment, the tear strength value of the electrodeposited copper foil is from 9.6 to 50 N/mm, such as 48, 45, 40, 35, 30, 25, 20, 15, or 10 N/mm. When the tear strength value is less than 9.6 N/mm, the copper foil is easily torn, which indicates that the strength of the copper foil is insufficient and the copper foil easily fractures when being prepared. When the tear strength value exceeds 50 N/mm, during the process of manufacturing the lithium-ion secondary battery, it is necessary to apply an excessive force to cut the electrodeposited copper foil. As a result, on the one hand the electrodeposited copper foil is not easily cut, and on the other hand copper chips tend to be generated during cutting to fabricate a defective lithium-ion secondary battery.

Figure 3C:
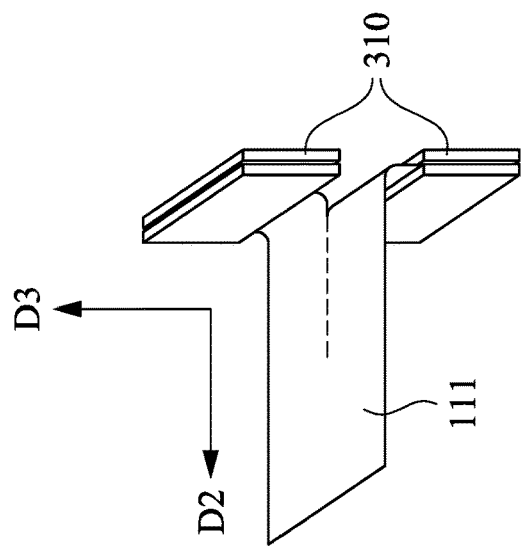
FIG. 3A to FIG. 3C depict schematic diagrams of a method for measuring a tear strength value of an electrodeposited copper foil at various stages according to one embodiment of the present disclosure.
Figure 3B:
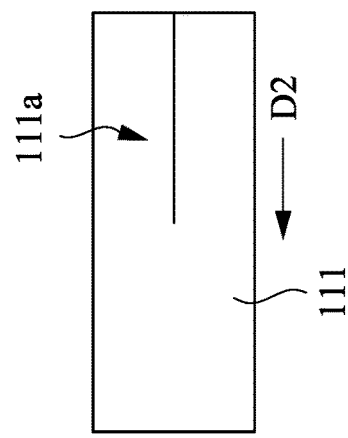
Figure 3A:
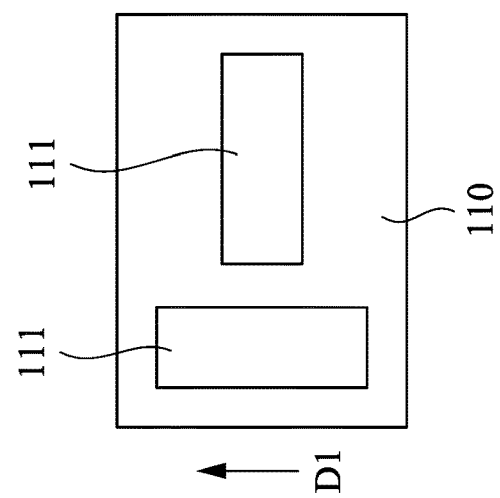

A method for measuring the tear strength value of the electrodeposited copper foil according to the present disclosure is provided as follows. The measurement is performed based on the trouser tear method in the Methods of Test for Tear Resistance CNS13787 K61038. A description is provided with reference to FIG. 3A to FIG. 3C. FIG. 3A to FIG. 3C depict schematic diagrams of a method for measuring a tear strength value of an electrodeposited copper foil at various stages according to one embodiment of the present disclosure. First, as shown in FIG. 3A, ten rectangular specimens 111 (having a length of 150 mm and a width of 50 mm) respectively belonging to two types of rectangular specimens 111 are cut out in parallel with and perpendicular to a working direction D1 of the electrodeposited copper foil 110.

Then, as shown in FIG. 3B, a cutting point is taken at one-half the width of each of the rectangular specimens 111 to cut a slit 111a up to one-half the length along a lengthwise direction D2. Next, as shown in FIG. 3C, each of the rectangular specimens 111 is mounted on jigs 310 of a tensile tester (INSTRON 5569). Each of the rectangular specimens 111 is torn along a longitudinal direction D3 perpendicular to the lengthwise direction D2 at a test speed of 200±20 mm/min. After that, values measured from the two types of rectangular specimens 111 (10 specimens in total) are averaged as the tear force (N) of the electrodeposited copper foil 110, and the tear strength value (N/mm) is calculated based on the following formula (2).

$$\text{tear strength value (N/mm)} = \frac{\text{tear force (N)}}{[\text{mass per unit area (g/m}^2)/\text{density(g/m}^3) \times 10^3 \text{ (mm/m)}]} \quad \text{Formula (2)}$$

In the above formulae (1) and (2), the mass per unit area (g/m$^2$) is measured by cutting the electrodeposited copper foil 110 into a specimen of 100 mm×100 mm (length×width). Then, the weight of the specimen is measured by using a microbalance (Model AG-204 manufactured by Mettler Toledo International Inc.). Next, the weight value (g) reflected by the reading is divided by the specimen area (0.01 m²) to obtain the mass per unit area (g/m²). In one embodiment, a mass per unit area of the electrodeposited copper foil 110 is from 17.8 to 329.4 g/m².

It is noted that the electrodeposited copper foil 110 does not tend to generate copper chips during cutting and the manufactured lithium-ion secondary battery has excellent charge-discharge cycle life when a ratio of the puncture strength value to the tear strength value of the electrodeposited copper foil 110 is within a specific range. For example, the charge-discharge cycle life is greater than 900 times. In greater detail, the ratio of the puncture strength value to the tear strength value of the electrodeposited copper foil 110 is from 14 to 64 according to one embodiment, such as 20, 25, 30, 35, 40, 45, 50, 55 or 60.

In summary, the present disclosure provides an electrodeposited copper foil, which has good grain uniformity and surface roughness. The lithium-ion secondary battery thus manufactured has excellent capacity. In addition, the electrodeposited copper foil according to the present disclosure further has the puncture strength value and the tear strength value within specific ranges, so the electrodeposited copper foil has superior mechanical properties. As a result, copper chips are not easily generated during cutting. In addition to that, the manufactured lithium-ion secondary battery has excellent charge-discharge cycle life owing to the puncture strength value and the tear strength value within the specific ranges.

The following embodiments are taken for example to illustrate in detail the method for manufacturing the electrodeposited copper foil of the present disclosure and physical properties thereof. However, the following embodiments are not intended to limit the present disclosure.

Preparation of Electrodeposited Copper Foils

Example 1

First, a copper wire was dissolved in a 50% by weight aqueous sulfuric acid solution to prepare a copper sulfate electrolyte containing 320 g/L copper sulfate ($CuSO_4 \cdot 5H_2O$) and 100 g/L sulfuric acid. Next, 1.2 mg of 3-S-isbthiuronium propylsulfonate (purchased from HOPAX), 60 mg of chromium trioxide (purchased from Sigma-Aldrich), 3.5 mg of polypropylene glycol (PPG, purchased from Sigma-Aldrich), and 25 mg of chloride ions (from hydrochloric acid, purchased from RCI Labscan) were added to per liter of copper sulfate electrolyte.

Then, the above solution was added to the electrolytic tank 211 of the electrodeposition apparatus 200 shown in FIG. 2, and an electrodeposited copper foil having a thickness of 6 μm was prepared at a solution temperature of 40° C. and a current density of 50 amp per square decimeter (A/dm²). After that, the anti-corrosion treatment 220 was performed. In greater detail, a chromium electrolyte containing 1.5 g/L of chromium trioxide ($CrO_3$) was used to form an anti-corrosion layer on the surface of the electrodeposited copper layer at a solution temperature of 25° C. and a current density of 0.5 A/dm² to prevent oxidation.

Example 2

In the present embodiment, an electrodeposited copper foil having a thickness of 6 μm was prepared in the same manner as embodiment 1 except that 10 mg of chromium trioxide was added to per liter of copper sulfate electrolyte.

Example 3

In the present embodiment, an electrodeposited copper foil having a thickness of 6 μm was prepared in the same manner as embodiment 1 except that 110 mg of chromium trioxide was added to per liter of copper sulfate electrolyte.

Example 4

In the present embodiment, an electrodeposited copper foil having a thickness of 6 μm was prepared in the same manner as embodiment 1 except that 2.0 mg of 3-S-isothiuronium propylsulfonate was added to per liter of copper sulfate electrolyte.

Example 5

In the present embodiment, an electrodeposited copper foil having a thickness of 6 μm was prepared in the same manner as embodiment 1 except that 0.8 mg of 3-S-isothiuronium propylsulfonate was added to per liter of copper sulfate electrolyte.

Example 6

In the present embodiment, an electrodeposited copper foil having a thickness of 3 μm was prepared in the same manner as embodiment 5 except that the rotation speed of the cathode drum 213 was changed.

Example 7

In the present embodiment, an electrodeposited copper foil having a thickness of 20 μm was prepared in the same manner as embodiment 5 except that the rotation speed of the cathode drum 213 was changed.

Comparative Example 1

In the present comparative example, an electrodeposited copper foil having a thickness of 6 μm was prepared in the same manner as embodiment 1 except that 5 mg of chromium trioxide was added to per liter of copper sulfate electrolyte.

Comparative Example 2

In the present comparative example, an electrodeposited copper foil having a thickness of 6 μm was prepared in the same manner as embodiment 1 except that 130 mg of chromium trioxide was added to per liter of copper sulfate electrolyte.

Comparative Example 3

In the present comparative example, an electrodeposited copper foil having a thickness of 6 μm was prepared in the same manner as embodiment 1 except that 3.0 mg of 3-S-isothiuronium propylsulfonate was added to per liter of copper sulfate electrolyte.

Comparative Example 4

In the present comparative example, an electrodeposited copper foil having a thickness of 6 μm was prepared in the same manner as embodiment 1 except that 0.5 mg of 3-S-isothiuronium propylsulfonate was added to per liter of copper sulfate electrolyte.

Comparative Example 5

In the present comparative example, an electrodeposited copper foil having a thickness of 3 μm was prepared in the same manner as comparative example 4 except that the rotation speed of the cathode drum 213 was changed.

Comparative Example 6

In the present comparative example, an electrodeposited copper foil having a thickness of 20 μm was prepared in the same manner as comparative example 4 except that the rotation speed of the cathode drum 213 was changed.

Next, a surface roughness (Rz) measurement was performed on the electrodeposited copper foil of each of embodiments 1 to 7 and comparative examples 1 to 6, and the mass per unit area, the puncture force value, and the tear force value were measured according to the previously mentioned methods. The puncture strength value and the tear strength value were thereafter calculated according to the above formulae (1) and (2), and the measurement and calculation results were recorded in the following Table 1.

The surface roughness (Rz) was measured based on the JIS B 0601-1994 method, and the measurement was performed by using an α-type surface roughness measuring instrument (Kosaka Laboratory Ltd., SE1700 series). In greater detail, in the sampling segment, the sum of the average value of the absolute values of the five consecutive peak heights and the average value of the absolute values of the five consecutive valley heights was taken as the surface roughness (Rz).

Copper Chip Test for Electrodeposited Copper Foil (Tape Test)

Example 8

Figure 4B:
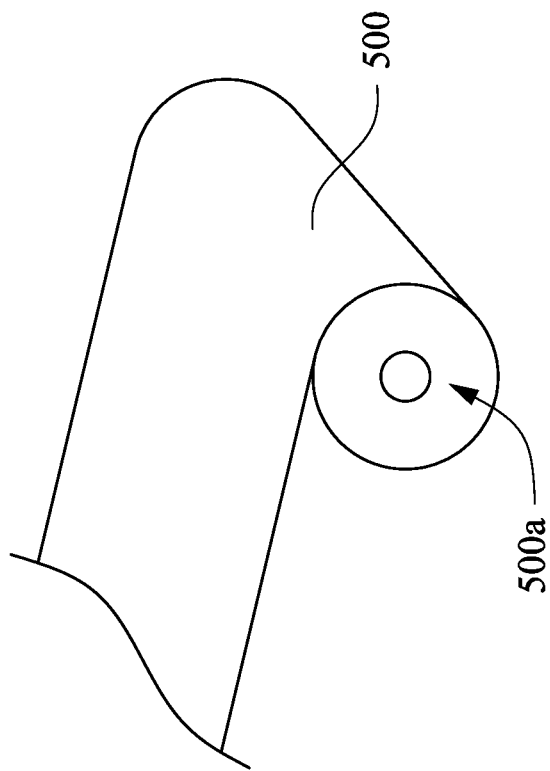
FIG. 4A to FIG. 4B depict schematic diagrams of a copper chip test of an electrodeposited copper foil at various stages according to one embodiment of the present disclosure.
Figure 4A:
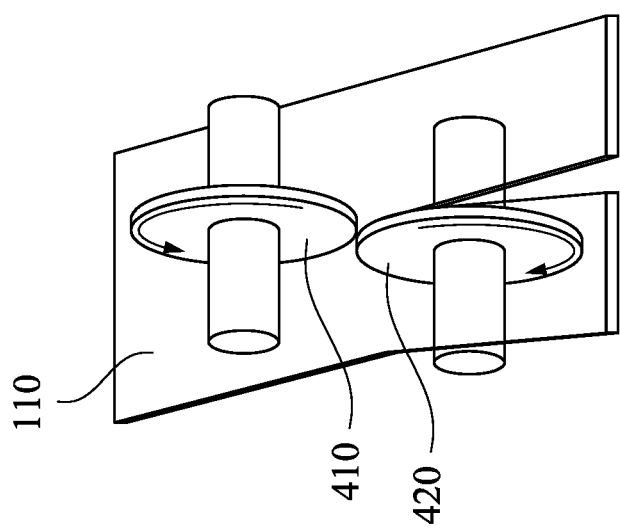

The electrodeposited copper foils of the above embodiments 1 to 7 and comparative examples 1 to 6 were cut by a cutter device. In greater detail, as shown in FIG. 4A, the electrodeposited copper foil 110 was cut by using an upper circular knife 410 and a lower circular knife 420 of the cutter device, and was wound to form a copper foil mother roll 500 as shown in FIG. 4B (the width was 652 mm, the length was 5000 m). Then, a cross section 500a of the copper foil mother roll 500 was adhered by using a transparent tape (EA0055G, manufactured by Seal King Industrial Co., Ltd.) having a length of 5 cm and a width of 2 cm, and an appropriate pressure was applied to the transparent tape. The peeled transparent tape was observed and the observation result was record in the following Table 1.

Manufacturing and Charge-Discharge Cycle Life Test of Lithium-Ion Secondary Battery Example 9

First, 89% by weight $LiCoO_2$ (used as a positive electrode active material), 5% by weight flake graphite (KS6, used as a conductive additive), 1% by weight conductive carbon powder (Super P®, used as a conductive additive), and 5% by weight solvent-based adhesive (PVDF 1300) were mixed to form a positive electrode material. Then, N-methyl-2-pyrrolidone (NMP) was used as a solvent for the positive electrode material to dissolve the positive electrode material (solid-liquid ratio: 195% by weight (that is, 100 g of positive electrode material: 195 g of NMP)) to form a positive electrode slurry. The positive electrode slurry was thereafter coated on an aluminum foil, and the aluminum foil was processed and cut into a specific size to form positive electrodes after the solvent in the positive electrode slurry was evaporated.

After that, 93.9% by weight mesophase graphite powder anode (MGPA, used as a negative electrode active material), 1% by weight conductive carbon powder (Super P®, used as a conductive additive), 5% by weight solvent-based adhesive (PVDF6020), and 0.1% by weight oxalic acid were mixed to form a negative electrode material. Next, N-methyl-2-pyrrolidone (NMP) was used as a solvent for the negative electrode material to dissolve the negative electrode material (solid-liquid ratio: 60% by weight (that is, 100 g of negative electrode material: 60 g of NMP)) to form a negative electrode slurry. Then, the negative electrode slurry was thereafter coated on the electrodeposited copper foils of the above embodiments 1 to 7 and comparative examples 1 to 6, and the copper foils were processed and cut into a specific size to form negative electrodes after the solvent in the negative electrode slurry was evaporated.

After that, the positive electrodes and the negative electrodes were alternately stacked, and a separator (manufactured by Celgard Company) was interposed between the positive electrode and the negative electrode. The positive electrodes, negative electrodes, and separators were thereafter placed in a container made of a molded laminated film. Next, an electrolyte was filled in the container and sealed to form a lithium-ion secondary battery. A size of the laminated battery was 41 mm×34 mm×53 mm.

Then, a charge-discharge cycle life test was performed on the lithium-ion secondary batteries. The charging mode was a constant current-constant voltage (CCCV) mode, the charging voltage was 4.2 V, and the charging current was kept constant at 5 C per second. The discharging mode was a constant current (CC) mode, the discharging voltage was 2.8 V, and the discharging current was 5 C per second. The charge-discharge test was performed at a temperature of 55° C., and the testing results were recorded in the following Table 1.

TABLE 1

|  | UPS (ppm) | $CrO_3$ (ppm) | Copper Foil Thickness (μm) | Mass Per Unit Area (g/m²) | Deposition Surface Rz (μm) | Puncture Force (N) |
|---|---|---|---|---|---|---|
| Embodiment 1 | 1.2 | 60 | 6 | 53.5 | 1.47 | 1.71 |
| Embodiment 2 | 1.2 | 10 | 6 | 53.5 | 0.71 | 2.87 |
| Embodiment 3 | 1.2 | 110 | 6 | 53.5 | 1.85 | 1.23 |
| Embodiment 4 | 2.0 | 60 | 6 | 53.5 | 1.40 | 0.76 |
| Embodiment 5 | 0.8 | 60 | 6 | 53.5 | 1.37 | 1.76 |
| Embodiments | 0.8 | 60 | 3 | 26.7 | 1.42 | 0.78 |
| Embodiment 7 | 0.8 | 60 | 20 | 178.2 | 1.40 | 7.25 |
| Comparative Example 1 | 1.2 | 5 | 6 | 53.5 | 0.93 | 3.06 |

TABLE 1-continued

| | | | | | | |
|---|---|---|---|---|---|---|
| Comparative Example 2 | 1.2 | 130 | 6 | 53.5 | 2.08 | 0.57 |
| Comparative Example 3 | 3.0 | 60 | 6 | 53.5 | 2.31 | 0.29 |
| Comparative Example 4 | 0.5 | 60 | 6 | 53.5 | 1.42 | 1.86 |
| Comparative Example 5 | 0.5 | 60 | 3 | 26.7 | 1.39 | 0.80 |
| Comparative Example 6 | 0.5 | 60 | 20 | 178.2 | 1.38 | 6.30 |

| | Puncture Strength Value ($N/mm^{1.17}$) | Tear Force (N) | Tear Strength Value (N/mm) | Puncture Strength Value/Tear Strength Value | Tape Test | Charge-Discharge Cycle Life Test (Times) |
|---|---|---|---|---|---|---|
| Embodiment 1 | 680.1 | 0.109 | 18.1 | 37.6 | o | 986 |
| Embodiment 2 | 1141.4 | 0.107 | 17.9 | 63.8 | o | 1225 |
| Embodiment 3 | 489.2 | 0.105 | 17.5 | 28.0 | o | 965 |
| Embodiment 4 | 302.3 | 0.061 | 10.2 | 29.6 | o | 904 |
| Embodiment 5 | 700.0 | 0.293 | 48.9 | 14.3 | o | 1079 |
| Embodiments | 698.0 | 0.145 | 48.3 | 14.5 | o | 1040 |
| Embodiment 7 | 704.9 | 0.950 | 47.5 | 14.8 | o | 1185 |
| Comparative Example 1 | 1217.0 | 0.108 | 18.0 | 67.6 | o | 854 |
| Comparative Example 2 | 226.7 | 0.116 | 19.3 | 11.7 | o | 479 |
| Comparative Example 3 | 115.3 | 0.058 | 9.6 | 12.0 | o | 408 |
| Comparative Example 4 | 739.7 | 0.362 | 60.4 | 12.2 | x | 754 |
| Comparative Example 5 | 715.9 | 0.181 | 60.4 | 11.9 | x | 612 |
| Comparative Example 6 | 612.5 | 1.208 | 60.4 | 10.1 | x | 779 |

It is noted that in the tape test of Table 1, the symbol "x" indicates that the peeled transparent tape has a copper chip having a size larger than 10 μm or more than 5 copper chips having a size smaller than 10 μm. The symbol "o" indicates that the peeled transparent tape is not stuck with a copper chip having a size larger than 10 μm, and is not stuck with more than five copper chips having a size smaller than 10 μm.

As can be seen from the data of embodiments 1 to 3 and comparative examples 1 and 2 in Table 1, reducing the concentration of chromium trioxide ($CrO_3$) can increase the grain uniformity of the electrodeposited copper foil to reduce the surface roughness (Rz). However, it is noted that the crystallinity uniformity of the copper foil starts to become poor, which actually causes the surface roughness to be increased, when the concentration of chromium trioxide is lowered to 5 ppm (comparative example 1), from the results of embodiment 2 and comparative example 1. In addition, reducing the concentration of chromium trioxide also increases the ratio of the puncture strength value to the tear strength value of the electrodeposited copper foil. On the contrary, the ratio of the puncture strength value to the tear strength value of the electrodeposited copper foil is decreased if the concentration of chromium trioxide is increased.

When the concentration of chromium trioxide is excessively low or excessively high (comparative example 1 and comparative example 2), the puncture strength value is too high or too low. Both situations cause the electrodeposited copper foil to tend to crack during charging and discharging, thus reducing the charge-discharge cycle life.

As can be seen from the data of embodiments 4 and 5 and comparative examples 3 and 4 in Table 1, reducing the concentration of 3-S-isothiuronium propylsulfonate (UPS) can reduce the surface roughness (Rz) of the electrodeposited copper foil. In addition, reducing the concentration of 3-S-isothiuronium propylsulfonate can also increases the puncture strength value and tear strength value of the electrodeposited copper foil.

When the concentration of 3-S-isothiuronium propylsulfonate is excessively high (comparative examples 3), the surface roughness (Rz) of the electrodeposited copper foil is too high. The negative electrode material coated on the surface of the electrodeposited copper foil is thus not uniform, which in turn reduces the charge-discharge cycle life. Additionally, an excessively high concentration of 3-S-isothiuronium propylsulfonate also causes an excessively low puncture strength value. As a result, the electrodeposited copper foil tends to crack during charging and discharging to reduce the charge-discharge cycle life. On the contrary, when the concentration of 3-S-isothiuronium propylsulfonate is excessively low (comparative examples 4), the tear strength value is too high. Under the circumstances, an excessive force needs to be applied to cut the electrodeposited copper foil when manufacturing the battery, and copper chips are easily generated.

In addition, as can be seen from the data of embodiments 5 to 7 and comparative examples 4 to 6 in Table 1, values of the surface roughness (Rz), puncture strength, and tear strength of the electrodeposited copper foils are similar. In other words, the surface roughness (Rz), puncture strength value, and tear strength value of the electrodeposited copper foil are not affected by the thickness of the copper foil.

In summary, the present disclosure provides an electrodeposited copper foil, which has good grain uniformity and surface roughness. The lithium-ion secondary battery thus manufactured has excellent capacity. In addition, the electrodeposited copper foil according to the present disclosure further has the puncture strength value and the tear strength value within specific ranges, so the electrodeposited copper foil has superior mechanical properties. As a result, copper chips are not easily generated during cutting. In addition to that, the manufactured lithium-ion secondary battery has excellent charge-discharge cycle life owing to the puncture strength value and the tear strength value within the specific ranges.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A copper foil for a current collector of a lithium secondary battery, wherein the copper foil has a puncture strength value and a tear strength value, and a ratio of the puncture strength value to the tear strength value is from 14 to 64.

2. The copper foil of claim 1, wherein the puncture strength value is from 300 to 1200 $N/mm^{1.17}$.

3. The copper foil of claim 1, wherein the tear strength value is less than 50 N/mm.

4. The copper foil of claim 1, wherein the copper foil has a deposition surface, and a surface roughness (Rz) of the deposition surface is less than 2.0 μm.

5. The copper foil of claim 1, wherein a mass per unit area of the copper foil is from 17.8 to 329.4 $g/m^2$.

6. A negative electrode comprising an electrodeposited copper foil, wherein the electrodeposited copper foil has a puncture strength value and a tear strength value, and a ratio of the puncture strength value to the tear strength value is from 14 to 64.

7. A copper foil for a current collector of a lithium secondary battery, wherein the copper foil has a puncture strength value of 300 to 1200 $N/mm^{1.17}$ and a tear strength value less than 50 N/mm.

8. The copper foil of claim 7, wherein the copper foil has a deposition surface, and a surface roughness (Rz) of the deposition surface is less than 2.0 μm.

9. The copper foil of claim 7, wherein a mass per unit area of the copper foil is from 17.8 to 329.4 $g/m^2$.

* * * * *